UNITED STATES PATENT OFFICE.

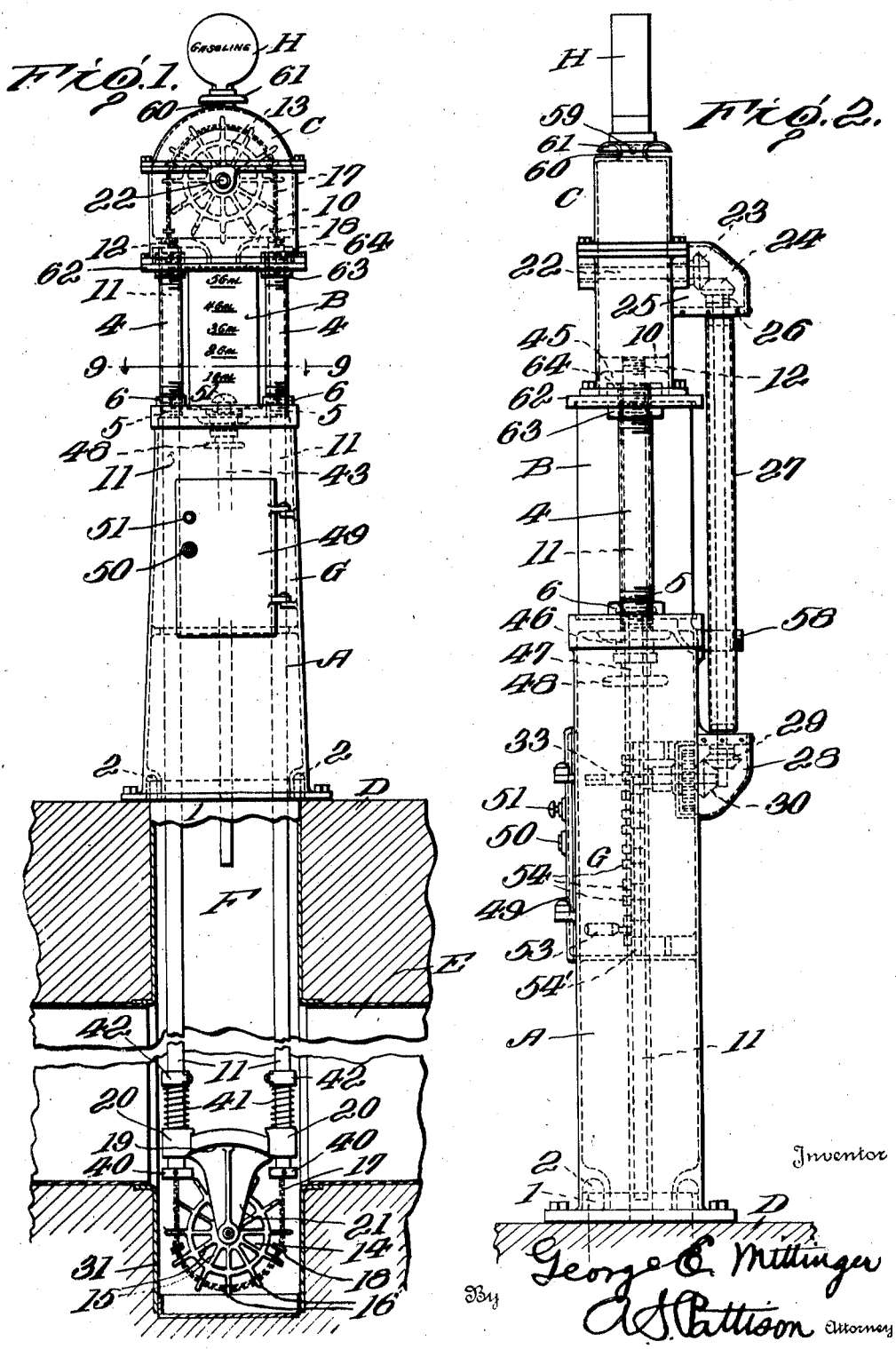

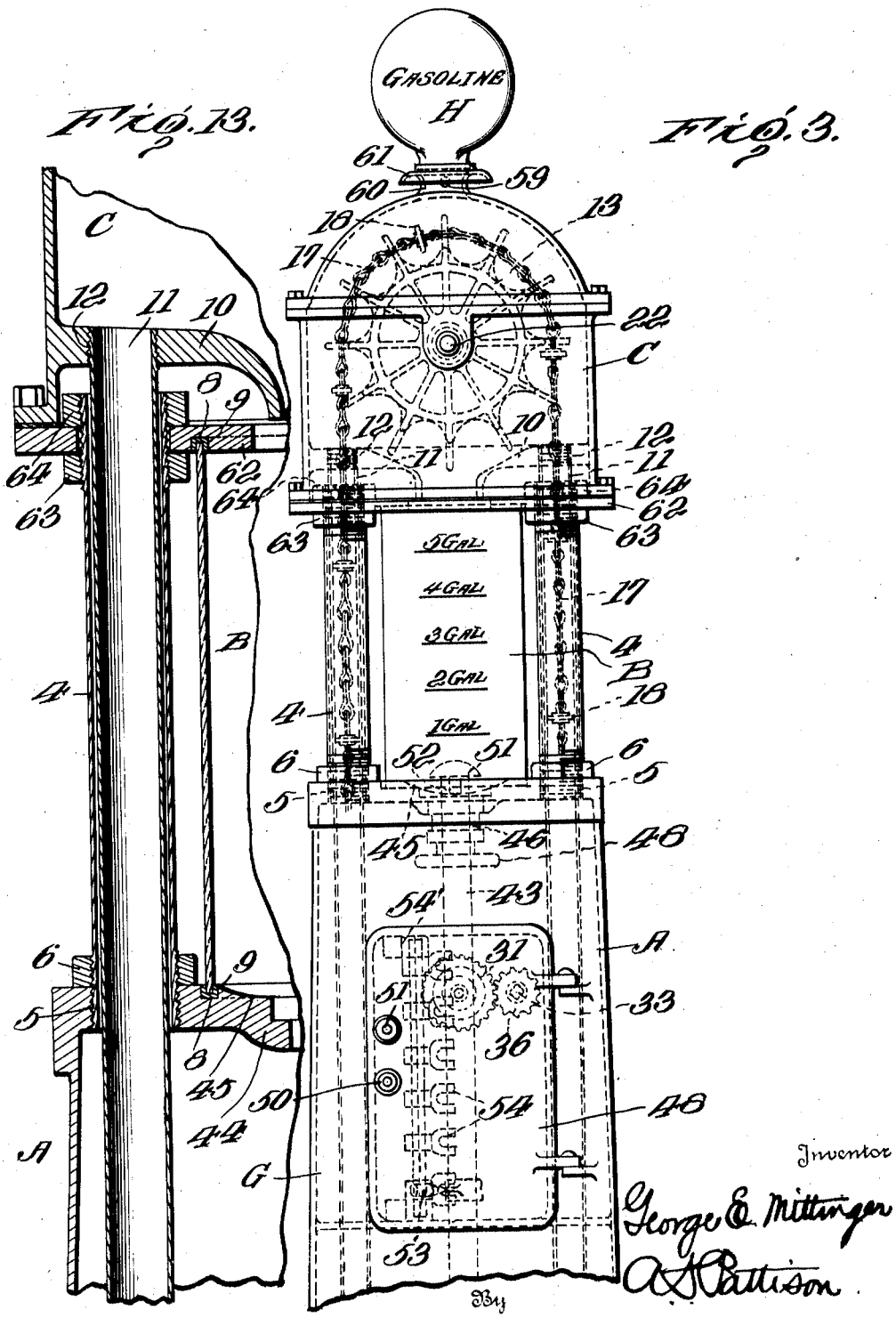

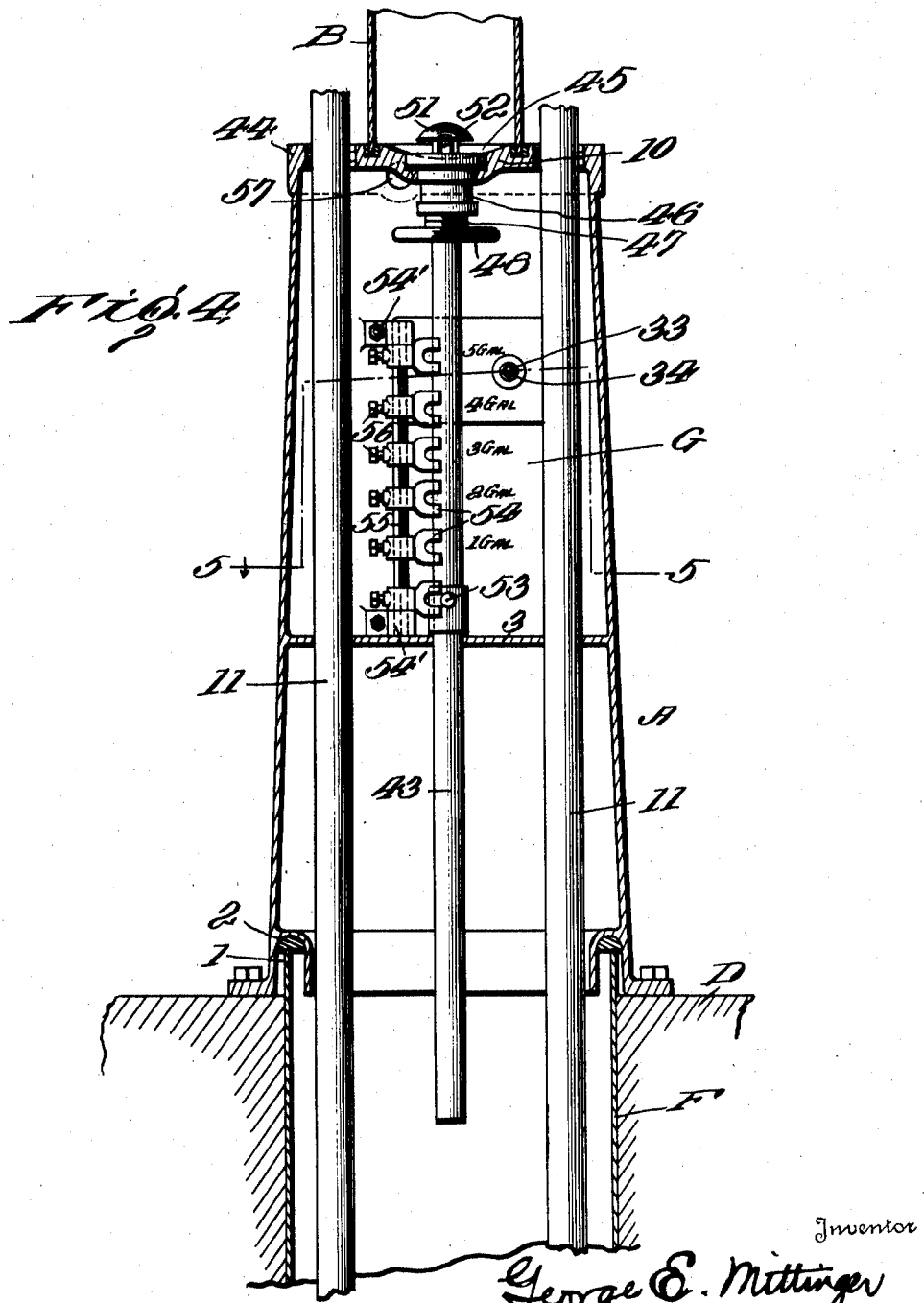

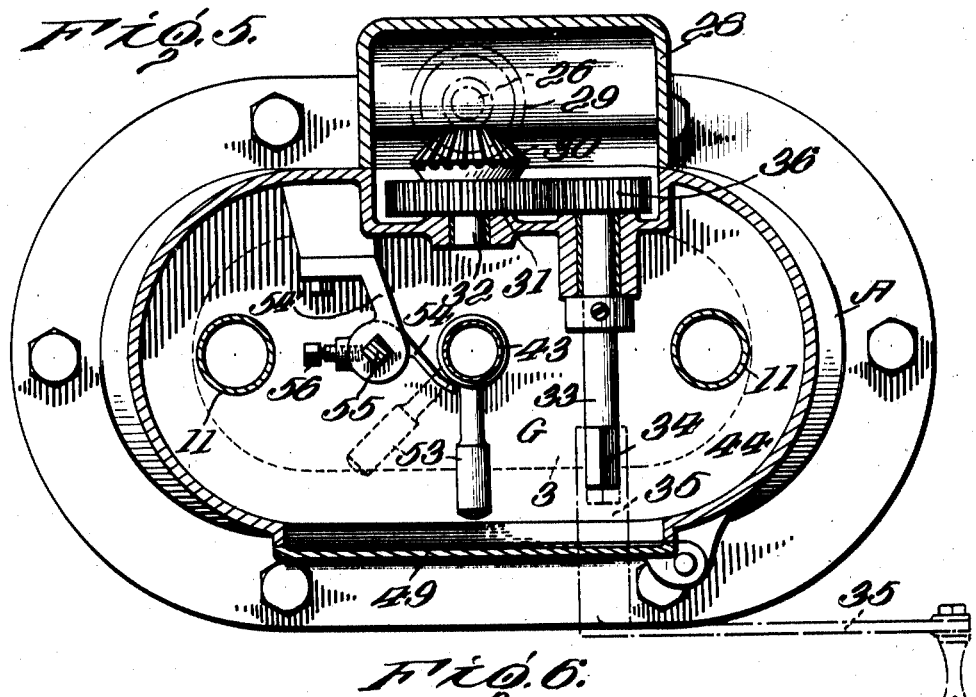
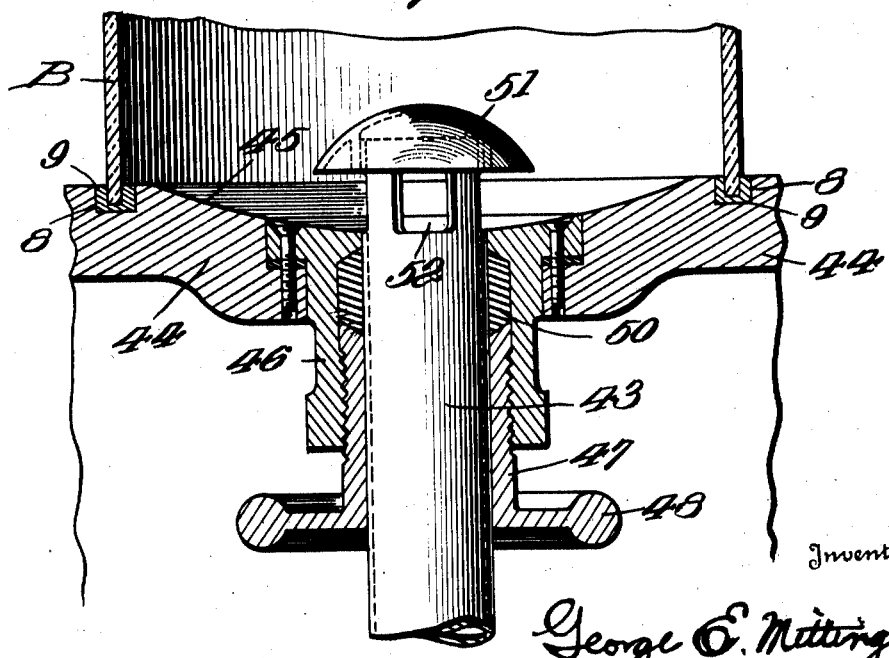

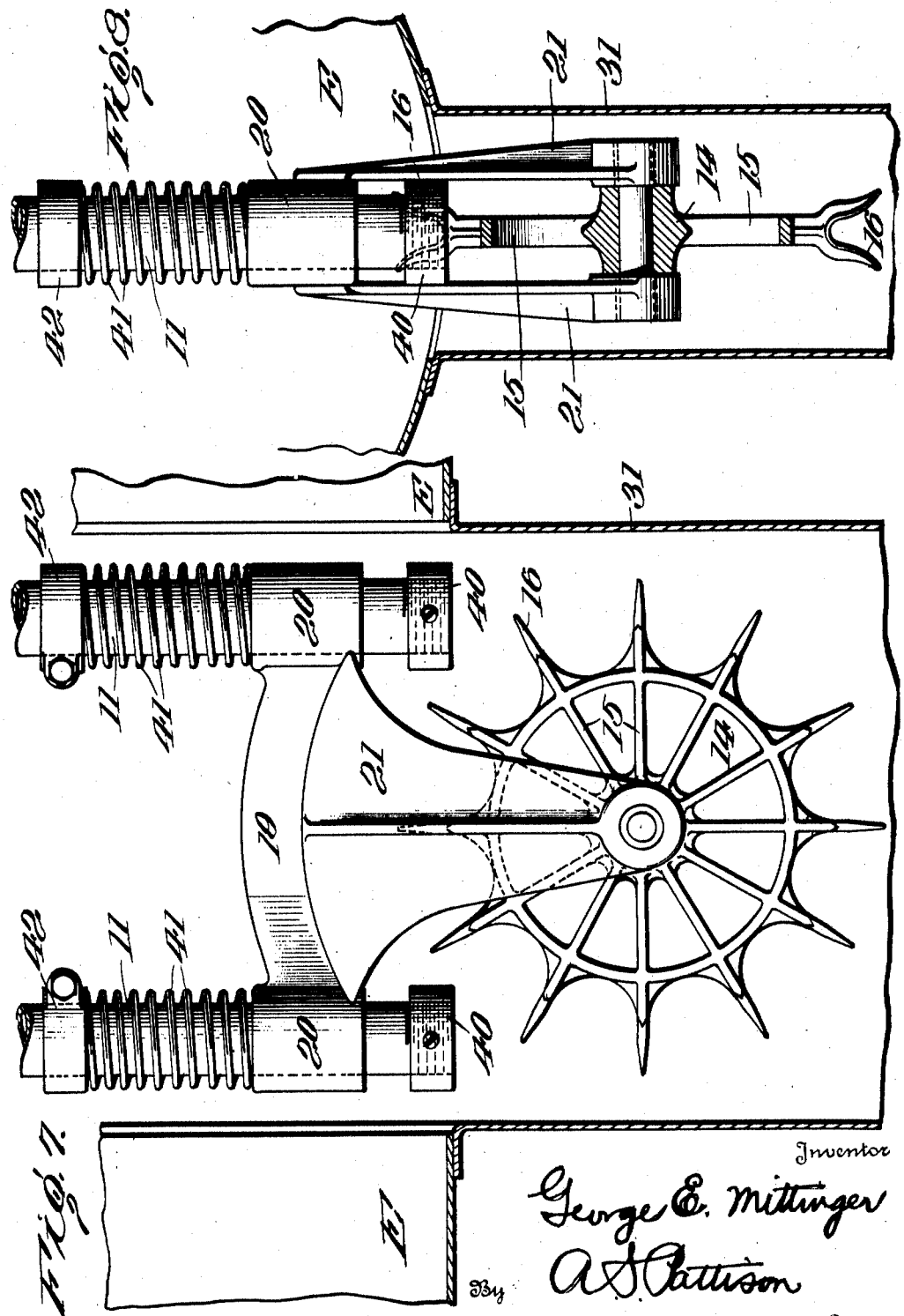

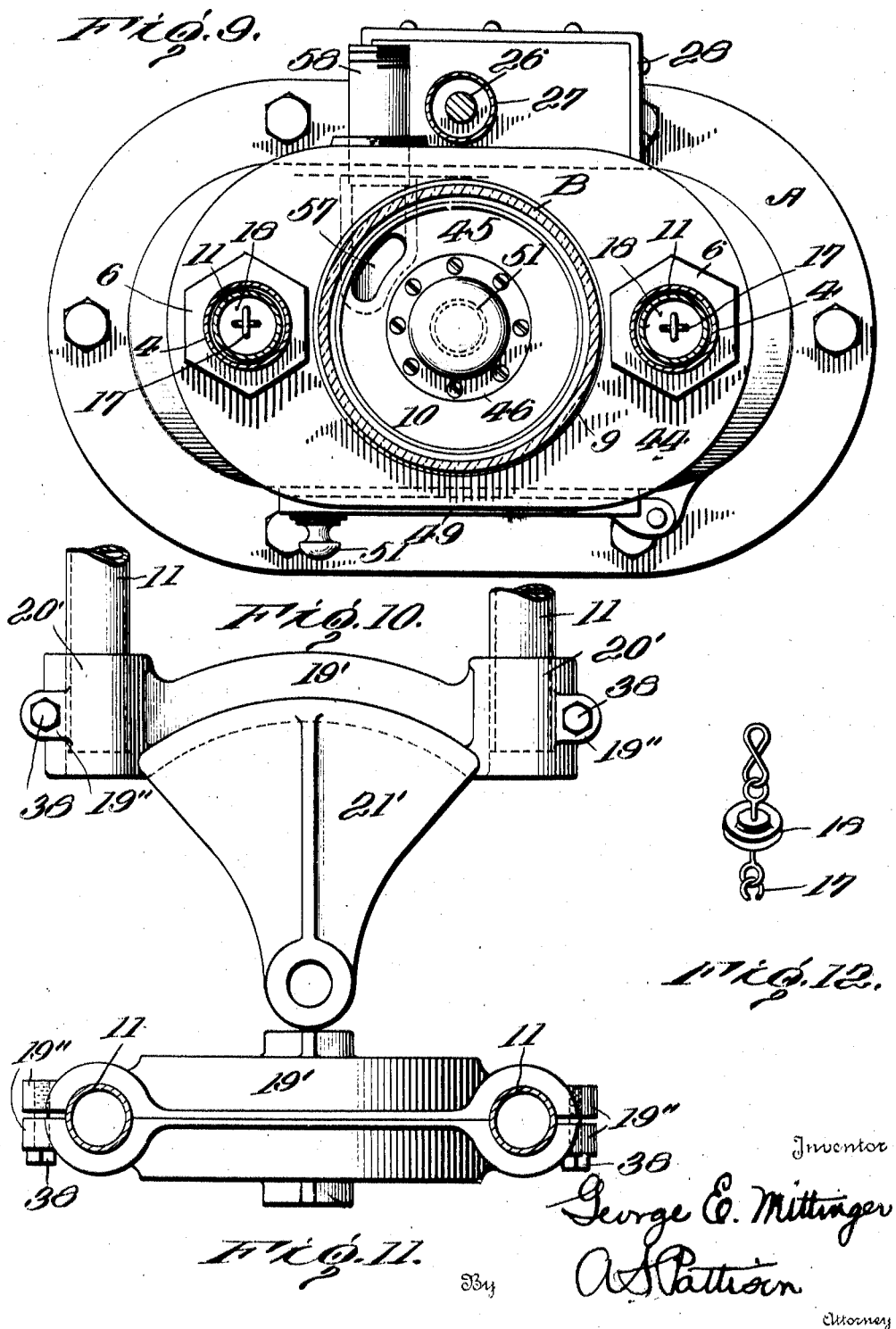

GEORGE EUGENE MITTINGER, OF YOUNGSTOWN, OHIO.

GASOLENE-DISPENSING DEVICE.

1,360,134.  Specification of Letters Patent.  Patented Nov. 23, 1920.

Application filed December 8, 1919. Serial No. 343,301.

*To all whom it may concern:*

Be it known that I, GEORGE E. MITTINGER, a citizen of the United States, residing at Youngstown, in the county of Mahoning and State of Ohio, have invented certain new and useful Improvements in Gasolene-Dispensing Apparatus, of which the following is a specification, reference being had therein to the accompanying drawing.

This invention relates to improvements in gasolene dispensing apparatus, and is of that type which is located in a suitable public place, and from which gasolene is dispensed in measured quantities directly into the receiving tank of an automobile or other receptacle.

My present improvement relates to that type of public gasolene dispensers in which the gasolene is elevated from a depressed tank into a transparent measuring receptacle and there retained in measured quantities visible to the purchaser, and from which it is directly delivered into the receiving tank of the automobile.

The object of my present invention is certain improvements in the visible type of gasolene dispensers, which improvement will be described and particularly pointed out in the claims.

In the accompanying drawings:

Figure 1 is an elevation of the complete apparatus with my improvements, the lower end of the inclosing case and tank being shown in section to disclose the lower portion of the apparatus.

Fig. 2 is a side elevation of that part of my improved apparatus, which is located above the ground.

Fig. 3 is a front elevation of that part of my apparatus located above the ground with the operating parts shown in dotted lines.

Fig. 4 is a vertical sectional view of that part of my improved apparatus including the operating box and the parts adjacent thereto.

Fig. 5 is a transverse sectional view on the irregular dotted line 5—5 of Fig. 4.

Fig. 6 is a vertical sectional view through the lower end of the transparent measuring receptacle and its adjacent coöperating parts.

Fig. 7 is an enlarged side elevation of the lower end of the pumping apparatus, the supply tank being shown in vertical section.

Fig. 8 is a view at right angles to Fig. 7, the adjacent part of the tank and the lower pump wheel shown in vertical section.

Fig. 9 is an enlarged horizontal sectional view on the line 9—9 of Fig. 1, looking in the direction indicated by arrow.

Fig. 10 is a side elevation of the lower pump wheel bracket showing a modified arrangement thereof.

Fig. 11 is a top plan view of Fig. 10.

Fig. 12 is a detached perspective view of a part of the pump chain, showing one of the pump disks attached thereto.

Fig. 13 is a vertical central sectional view through one of the pump tubes and inclosing casing located between the top pump housing and the combined supporting and operating housing.

In carrying out my present improvement, I provide a combined supporting and operating housing A, upon which is mounted a transparent measuring and dispensing receptacle or cylinder B. Mounted on top of this transparent measuring receptacle B, is an upper pump housing C. The lower end of the supporting housing A is suitably supported on the surface D at or approximately at the ground or floor level. Buried below the surface D, the proper distance to comply with the regulations, is a supply tank E, which is preferably placed in a horizontal position and will be of any desired capacity. A vertically arranged casing F is carried by and in tight communication with the upper wall of the supply tank E, the upper end 1 of the casing, being located in an annular vertical groove 2, formed in the lower end of the supporting housing A. This construction places the supply tank E in communication with the lower end of the supporting housing A, through the vertical casing F, as clearly shown. The joint 1 and 2 may be, if necessary, provided with any suitable packing (not shown).

The supporting housing A, has its upper portion formed into an operating box G, the lower wall of which is formed by a transverse web 3, and its upper wall formed by the upper end of the supporting housing A.

The pump housing C is supported and connected with the upper end of the supporting housing A, by means of two vertical tubes 4, which extend at opposite sides of the transparent measuring receptacle B. The lower ends of the tubes 4, are screwed into the top of the housing A, as at 5, and held in position by suitable locking nuts 6, threaded onto the lower ends of the tubes 4. The upper ends of the tubes 4 have a suitable screw-threaded connection 63 and 64, with the lower end of the pump housing C. For the purpose of making a tight joint at the upper and lower ends of the measuring receptacle B, the upper end of the housing A and the lower end of the housing C are provided with grooves 8, in which the ends of the receptacle B fit, and these grooves have suitable packings 9, with which the ends of the receptacle B are tightly forced in contact through the medium of the threaded tubes 4.

Located at the top of the pump housing C is a suitable hollow sign H, containing the word "Gasolene", and this hollow sign may be illuminated by a suitable light (not shown) electric or oil.

The pump housing C has a funnel shaped bottom 10, which communicates with the measuring receptacle B, so that the gasolene that is lifted into this pump housing C immediately flows into the measuring receptacle B.

In my improved gasolene dispensing apparatus, the gasolene is lifted from the supply tank E into the top pump housing C, and immediately flows by gravity therefrom into the measuring receptacle B as rapidly as it is lifted into the said housing.

I will now describe the pumping means for lifting the gasolene from the tank E into the pump housing C. This pumping mechanism consists of two vertical tubes 11, which extend from the bottom 10 of the housing C through the tubes 4; through the housing A, including the operating box G, through the casing F and down to or near the bottom of the supply tank E. The upper ends 12 of the tubes 11 are screw-threaded into the bottom 10 of the housing C, and have their upper ends in open communication with the said housing.

An operating chain wheel 13 is journaled and inclosed within the housing C, in any suitable manner, and located below the lower ends of the pump tubes 11 is a chain wheel 14. Each of these chain wheels 13 and 14 have the outer ends of their spokes 15 made fork shaped, as shown at 16. An endless chain 17 passes around the chain wheels 13 and 14, and this endless chain carries a suitable number of pump disks 18 of a size approximately fitting the interior of the tubes 11, so that they will move freely through the said tubes.

The lower pump wheel 14 is supported upon a suitable yoke 19, which has at its end sockets 20 to receive the lower ends of the pump tubes 11, and downwardly projecting parallel arms 21 between which the wheel 14 is suitably journaled to freely revolve.

The pump is operated through the operating wheel 13, and this is accomplished by making the wheel fast to its shaft 22, in any suitable manner and having one end of the shaft extending through the housing and carrying a bevel pinion 23. Meshing with this pinion 23 is a beveled pinion 24 rotating on an axis at right angles to the axis of the pinion 23, and these two pinions are located within and protected by a suitable laterally extending housing 25, as clearly shown in Fig. 2. The pinion 24 is carried by a vertical shaft 26, which loosely passes through a vertical tube 27. The upper end of the tube 27 is suitably connected with the housing 26, and the lower end of the tube is suitably connected with a housing 28. This housing 28 projects laterally from the back of the operating box G and the lower end of the shaft 26 extends into the box and carries a bevel pinion 29 which meshes with a bevel pinion 30. This pinion 30 is carried by a gear 31 that is mounted upon a suitable stub-shaft 32. An operating shaft 33 extends into the box and has its end 34 shaped to detachably receive an operating handle 35 (shown in dotted lines Fig. 5). The other end of the shaft 33 carries a gear 36, which is preferably relatively smaller than the gear 31 with which it meshes.

From the foregoing description, it will be readily understood that when the operating shaft 32 is rotated by the detachable handle 35, the pump chain 17 is rotated and gasolene is elevated through one of the tubes 11 into the pump housing C, and immediately flows therefrom through the funnel-shaped bottom 10 into the measuring receptacle B. It will also be understood that this will happen irrespective of the direction that the pump handle may be rotated. Attention is called to the fact that it is not intended to have the pump disks 18 fit the pump tubes 11 leak-tight, but, to the contrary, are to fit in a manner to permit them to freely move, but sufficiently tight to elevate the liquid through the tube into the housing C. For the purpose of positioning the lower receiving ends of the pump tubes 11 at, or adjacent to the bottom of the supply tank E, the bottom of the supply pump is provided with a depending well 37, to receive the lower chain wheel 14. It will also be understood that the gasolene will normally rise in the pump tubes 11 to a level corresponding to the gasolene in the tank E.

The yoke 19, in which the lower chain wheel 14 is journaled, may be placed under spring tension, as shown in Figs. 1, 7 and 8, or may be rigidly connected with the ends of the pump tubes 11, as shown in Fig. 10. In the form shown in Figs. 10 and 11, the yoke 19' is preferably made in two parts and its ends provided with projecting ears 19″ through which clamping bolts 38 pass, for the purpose of clamping the two parts of the tank together, and at the same time clamping it to the lower ends of the pumping tubes 11. In this construction, the ends of the yoke 19′ are provided with vertical sockets 39, which receive the lower ends of the pump tubes 11, as clearly shown in Figs. 10 and 11. In the form of yoke shown in Figs. 1, 7 and 8, the sockets 20 move freely on the lower ends of the tubes 11 and are limited in their downward movement by collars 40, which are suitably detachably held to the extremities of the tubes 11, and spiral springs 41 are located between the sockets 20 and the collars 42, which are adjustably clamped to the tubes 11 for the purpose of adjustably holding the upper ends of the springs 41.

*Measuring means.*

In my form of dispensing apparatus, the pump is in no sense a measuring device. The amount of gasolene dispensed is controlled by a vertically adjustable overflow pipe 43. This pipe extends through the center of the top 44 of the housing A, and that part of this top inclosed within the lower end of the transparent measuring receptacle B, forms the bottom of the said receptacle. The bottom is preferably concaved, as shown at 45. The overflow pipe 43 passes through a suitable depending stuffing box 46, the adjustable member 47 of the stuffing box carrying a suitable hand wheel 48. This hand wheel 48 is within the upper part of the operating box G, so that it may be reached through the door opening of the operating box when the door 49 is opened, for the purpose of enabling the packing 50 of the stuffing box to be conveniently tightened when necessary to prevent leakage. A projecting crown-top 51 is provided for the upper end of the overflow pipe 43, and below this crown-top the pipe is provided with any suitable number of lateral passages 52, through which gasolene will overflow into the pipe and through the pipe into the casing F, or lower end of the housing A, to the supply tank E.

A laterally projecting handle 53 is carried by the overflow pipe 43, and this handle is adapted to enter any one of a plurality of horizontally projecting U-shaped receiving and supporting members 54, for the purpose of supporting the overflow pipe 43 in the proper elevation in the transparent measuring receptacle B, and to retain within the measuring receptacle B the desired quantity of gasolene to be dispensed therefrom. These receiving and supporting members 54 are vertically adjustably held on a vertical rod 55 by suitable clamping screws 56, for a purpose which will now be explained.

The transparent measuring receptacle B is composed of a glass cylinder. In practice, these glass cylinders are either not absolutely uniform in thickness or absolutely straight walled or both, and for these reasons it is recognized that the same measuring markings, if applied to the cylinders, would not give accurate measurement. For this reason, and in order to insure my apparatus delivering accurate measurement, each receptacle B will be set in proper position upon a bottom corresponding with the bottom of the apparatus and accurately measured quantities of liquid successively placed therein and each accurately marked on the glass receptacle B. Because of the inaccuracy of the glass receptacle B, as before stated, there will be slight variation in the location of the markings on measuring receptacles of different apparatus. To accommodate this variation, the receiving and supporting members 54 are made vertically adjustable so that the overflow pipe 43 can be successively elevated to the proper positions to agree with the graduations on the receptacle B and the supporting members 54 vertically adjusted to their proper positions to receive the handle 53, when the overflow tube 43 has been elevated to the proper positions for the various measurements. From this it will be observed that the overflow pipe 43 has a vertical movement to the proper elevation, and a lateral movement to carry the handle into its proper receiving and supporting member 54.

In operation if, for instance, three gallons of gasolene is desired, the overflow pipe is lifted and the handle 53 turned into its proper supporting member 54. The pump is then operated, elevating the gasolene into the measuring receptacle B to a point to or slightly above the overflow of the pipe 43, any surplus gasolene will immediately flow back into the supply pipe, leaving the desired measured quantity in the glass measuring receptacle B, so that the purchaser can see that he is receiving the proper quantity paid for. The measured quantity is drawn from the outlet 57, located at the lowest part of the bottom 45 of the measuring receptacle, through a suitable outlet pipe 58, which will be provided at any desired point with a controlling valve (not shown).

I am aware that transparent measuring receptacles, overflow-pipes and chain pumps are not new in devices of this character, but so far as I am aware, these elements have not been relatively arranged and constructed as herein disclosed.

For the purpose of venting the housing C and measuring receptacle B, vent openings 59 are provided in an extension 60 at the top of the housing C. For the purpose of protecting these vent openings from the weather, such as rain, snow, etc., a depending protecting annular flange 61, extends from the extension 60.

It will be readily understood that a suitable cable may be substituted for the chain 17 without departing from my invention.

The door 49 is provided with a suitable lock 50, for locking the door and preventing the apparatus from being tampered with by unauthorized persons. The door is provided with any suitable handle for opening and closing it.

Having thus described my invention, what I claim and desire to secure by Letters Patent is:

1. An apparatus of the type described, comprising a supply tank, a supporting housing thereabove, an upper housing having a bottom above and apart from the supporting housing, an open ended measuring receptacle clamped between the adjacent ends of the housings to make tight joints, the bottom of the top housing having an outlet opening in communication with the measuring receptacle, a pump tube having its upper end in communication with the top housing and extending down with its lower end into the supply tank, means for elevating the liquid from the supply tank through the pump tube and into the top housing, and means for measuring the elevated liquid in the measuring receptacle and dispensing the measured quantity therefrom.

2. An apparatus of the type described, comprising a supply tank, a supporting housing thereabove, an upper housing above and apart from the upper end of the supporting housing, an open ended measuring receptacle with its ends clamped between the two housings to make tight joints, the upper housing having a bottom in communication with the top of the measuring receptacle, a pump tube having its upper end in communication with the upper housing and extending down outside of the measuring receptacle and through the supporting housing to and within the supply tank, means for elevating liquid from the supply tank into the upper housing, and means for measuring the liquid within and dispensing it from the measuring receptacle.

3. An apparatus of the type described, comprising a supply tank, a supporting housing thereabove, an upper housing above and apart from the supporting housing, a measuring receptacle supported between the said housings, the upper housing in communication with the top of the measuring receptacle, two pump tubes having their upper ends in communication with the upper housing and extending down with their lower ends in communication with the supply tank, an endless pump disk carrying member adapted to move through the said tubes, and extending beyond their upper and lower ends, means for moving the disk carrying member through the tubes for elevating liquid into the upper housing, and means for measuring the liquid within and dispensing it from the said measuring receptacle.

4. An apparatus of the type described, comprising a supply tank, a vertical supporting housing thereabove, an upper housing above and apart from the supporting housing, a measuring vessel supported between the adjacent ends of the housings, the upper housing in communication with the top of the measuring receptacle, two parallel pump tubes having their upper ends in communication with the upper housing and their lower ends in communication with the supply tank, an endless disk-carrying member passing through the tubes and beyond their ends, a wheel at one end of the tubes around which the said endless member passes, means for rotating the wheel to move the endless member through the tubes and elevating the liquid to the upper housing, and therefrom to the measuring receptacle, and means for measuring the liquid within and dispensing it from the measuring receptacle.

5. An apparatus of the type described, comprising a supply tank, a vertical housing above the supply tank, an upper housing above and apart from the supporting housing, a measuring receptacle between the adjacent ends of the housings, parallel pump tubes having their upper ends in communication with the upper housing and extending down outside of the measuring receptacle, to and within and communicating with the supply tank, an endless disk-carrying member passing through the said pump tubes, an operating wheel within the upper housing around which the disk-carrying member passes, means for rotating the said wheel to elevate the liquid from the supply tank into the upper housing and therefrom to the measuring receptacle, and means for measuring the liquid within and dispensing it from the said measuring receptacle.

6. An apparatus of the type described, comprising a supply tank, a vertical supporting housing thereabove, an upper housing above and apart from the supporting housing, a measuring receptacle between the said housings, the bottom of the upper housings in communication with the measuring receptacle, two parallel tubes having their upper ends in communication with the upper housing and their lower ends extending into and in communication with the supply tank, endless disk-carrying members passing through the tubes and extending beyond their upper and lower ends, a wheel within the upper housing, a wheel below the lower ends of the tubes around which wheels the endless disk-carrying member passes, means for rotating one of the wheels and moving the endless member through the tubes for the purpose described, and means for measuring the liquid within and dispensing it from the measuring receptacle.

7. An apparatus of the type described, comprising a supply tank, a supporting housing thereabove, an upper housing above and apart from the supply tank, a measuring receptacle between the adjacent ends of the housing, the bottom of the upper housing communicating with the top of the measuring receptacle, two parallel tubes having their upper ends communicating with the housing and the lower ends communicating with the supply tank, an endless disk carrier passing through and beyond the ends of the parallel tubes, a wheel within the upper housing, a wheel supported by the lower ends of the tubes, the endless carrier passing around the said wheels, means for rotating one of the wheels, and means for measuring the liquid within and dispensing it from the said measuring receptacle.

8. An apparatus of the type described, comprising a supply tank, a supporting housing thereabove, an upper housing above and apart from the supporting housing, a measuring receptacle between the adjacent ends of the housings, parallel tubes having their upper ends communicating with the upper housing and their lower ends communicating with the supply tank, the bottom of the upper housing communicating with the measuring receptacle, an endless disk-carrier passing through the tubes and extending beyond their ends, a wheel within the upper housing, a wheel below the lower ends of the tubes and around which wheels the endless carrier passes, the supporting housing provided with an operating box, and an operating means extending from the box and connected with the wheel in the upper housing to rotate it, for the purpose described, and means for measuring the liquid within and dispensing it from the measuring receptacle.

9. An apparatus of the type described, comprising a supply tank, a supporting housing thereabove, an upper housing above and apart from the supporting housing, a measuring receptacle between the housings, the bottom of the upper housing in communication with the measuring receptacle, a liquid supply tube communicating with the upper housing and with the supply tank, means for elevating the liquid through the supply pipe, operating means located within the upper housing for the liquid elevating means, the supporting housing provided with an operating box and an operative connection extending from the box up to and operatively connected with the operating means, in the upper housing.

10. An apparatus of the type described, comprising a supply tank, a supporting housing above the supply tank, an upper housing above and apart from the supporting housing, a measuring receptacle between the adjacent ends of the housing, the bottom of the upper housing in communication with the measuring receptacle, a liquid supply pipe communicating with the upper housing and with the supply tank, a pump for forcing liquid through the supply pipe, an operating means for the pump located within the upper housing, the supporting housing having an operating box, and an operating connection extending from the box up to and connected with the pump operating means in the upper housing, and means for measuring the liquid within and dispensing it from the measuring receptacle.

11. In a structure substantially as set forth in claim 3, the parallel pump tubes carrying at their lower ends a wheel around which the endless disk carrier passes, the pump tubes and their connected parts connected and supported by the bottom of the upper housing.

12. In a structure such as defined in claim 8, the bottom of the supply tank having a depending wall, and a wheel supporting yoke at the lower ends of the pump tubes and extending into said well to carry the lower wheel, the parts combined for the purpose described.

13. An apparatus of the type described, comprising a supply tank, a supporting housing thereabove, an upper housing above and apart from the supporting housing, a measuring receptacle supported between the housings, the upper housing in communication with the measuring receptacle, a pump tube having its upper end in communication with the upper housing and its lower end extending into the supply tank, an endless pump disk carrying member within and movable through the tube, a guiding member in the upper housing for the endless member, means for moving the endless member upward through the pump tube to elevate liquid from the supply tank into the upper housing, and means for measuring the liquid within and dispensing it from the said measuring receptacle.

In testimony whereof I hereunto affix my signature.

GEORGE EUGENE MITTINGER.